(12) United States Patent
Kong et al.

(10) Patent No.: US 8,021,770 B2
(45) Date of Patent: Sep. 20, 2011

(54) PERPENDICULAR MAGNETIC RECORDING MEDIUM

(75) Inventors: Sok-hyun Kong, Seoul (KR); Hoo-san Lee, Osan-si (KR); Sadayuki Watanabe, Tokyo (JP); Shunji Takenoiri, Tokyo (JP)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 12/722,565

(22) Filed: Mar. 12, 2010

(65) Prior Publication Data

US 2010/0233516 A1    Sep. 16, 2010

(30) Foreign Application Priority Data

Mar. 13, 2009   (KR) .................. 10-2009-0021883

(51) Int. Cl.
    *G11B 5/66* (2006.01)
(52) U.S. Cl. .................... 428/828.1; 428/831.2
(58) Field of Classification Search .............. None
    See application file for complete search history.

(56) References Cited

U.S. PATENT DOCUMENTS

| 2007/0230052 | A1* | 10/2007 | Ajan et al. ............ 360/131 |
| 2007/0237986 | A1 | 10/2007 | Wu et al. |
| 2009/0257147 | A1* | 10/2009 | Ajan ............ 360/125.02 |

FOREIGN PATENT DOCUMENTS

| JP | 2004-288348 | 10/2004 |
| JP | 2006-286103 | 10/2006 |
| JP | 2007-066416 | 3/2007 |

* cited by examiner

*Primary Examiner* — Holly Rickman
(74) *Attorney, Agent, or Firm* — Volentine & Whitt, PLLC

(57) ABSTRACT

A perpendicular type of magnetic recording medium includes a substrate, a soft magnetic underlying section including a plurality of distinct layers soft magnetic material, a recording section, and an intermediate section upon which the recording section is formed. The intermediate section is provided to improve the crystal orientation and impart a desired magnetic characteristic to the recording section. An uppermost one of the layers of soft magnetic material which, of all of the layers of soft magnetic material, is disposed closest to the intermediate section is predisposed to induce the intermediate section to crystallize in a desired way as it is formed. Therefore, the intermediate section may have a minimal thickness and yet achieve a crystallization that is sufficient to control the forming of the recording section.

12 Claims, 2 Drawing Sheets

PERPENDICULAR MAGNETIC RECORDING MEDIUM

PRIORITY STATEMENT

This application claims the benefit of Korean Patent Application No. 10-2009-0021883, filed on Mar. 13, 2009, in the Korean Intellectual Property Office.

BACKGROUND

The inventive concept relates to magnetic recording media. More particularly, the inventive concept relates to a perpendicular magnetic recording medium in which the direction of magnetization of bits of recorded data is perpendicular to the surface of a magnetic layer.

The amount of information or data that must be processed by today's electronic devices is constantly rapidly increasing. Accordingly, the data must be recorded (stored) with a high-density and the data must be capable of being recorded/reproduced at a rapid rate. In this regard, magnetic recording devices have characteristics such as large storage capacity and fast access time. Accordingly, magnetic recording devices are being widely used as information memory devices by various digital devices, as well as by computers. These magnetic recording devices employ a magnetic recording medium to record (store) data, and a magnetic head (having a magnetic recording mechanism and a reproducing sensor) to write data onto/read data from the magnetic recording medium.

A magnetic recording medium of a magnetic recording device may be of a longitudinal magnetic recording type or a perpendicular magnetic recording type according to the way in which the medium records (stores) data. In a longitudinal type of magnetic recording medium, the direction of magnetization of bits of recorded data is parallel to a surface of a magnetic layer. In a perpendicular type of magnetic recording medium, the direction of magnetization of bits of recorded data is perpendicular to the surface of the magnetic layer. Data can be recorded with a higher recording density on a perpendicular type of magnetic recording medium than on a longitudinal type of magnetic recording medium.

A conventional perpendicular magnetic recording medium includes a soft magnetic underlayer, a recording layer having tracks along which data is recorded, and a passivation layer. The intermediate layer is provided, in part, to impart a specific crystallographic orientation to the recording layer formed thereon. However, the intermediate layer must be at least about 20 nm if it is to have a sufficient affect on the crystallization of the recording layer. Furthermore, the intermediate layer is formed of a relatively expensive material such as Ru. Thus, the thick intermediate layer of the conventional perpendicular magnetic recording medium contributes a significant amount to the relatively high cost of manufacturing the medium.

The soft magnetic layer serves to attract the magnetic field generated by magnetic head during a recording (write) operation However, the magnetic head is spaced relatively far from the soft magnetic underlayer because the intermediate layer is interposed between the recording layer and the soft magnetic underlayer. Thus, magnetic field generated by the head to write data onto the recording layer is dispersed by the provision of the intermediate layer. That is, the intermediate layer counteracts the effect of the soft magnetic underlayer.

SUMMARY

According to an aspect of the inventive concept, there is provided a perpendicular magnetic recording medium including a substrate, a soft magnetic material section including a plurality of distinct layers of soft magnetic material disposed on the substrate, an intermediate section and disposed on the soft magnetic material section, and a recording section comprising a crystalline layer of magnetic material disposed on the intermediate section. The intermediate section comprises crystalline material predisposed to control a crystallizing of the material of the recording section when the recording section is formed on the intermediate section. Also, an uppermost one of the layers of soft magnetic material which, of all of the layers of soft magnetic material, is disposed closest to the intermediate section, is predisposed to impart a desired crystalline structure to material of the intermediate section when the intermediate section is formed on the soft magnetic material section.

BRIEF DESCRIPTION OF THE DRAWINGS

The inventive concept will be more clearly understood from the following detailed description of the preferred embodiments thereof made in conjunction with the accompanying drawings in which.

DETAILED DESCRIPTION OF THE PREFERRED EMBODIMENTS

Figure 1:
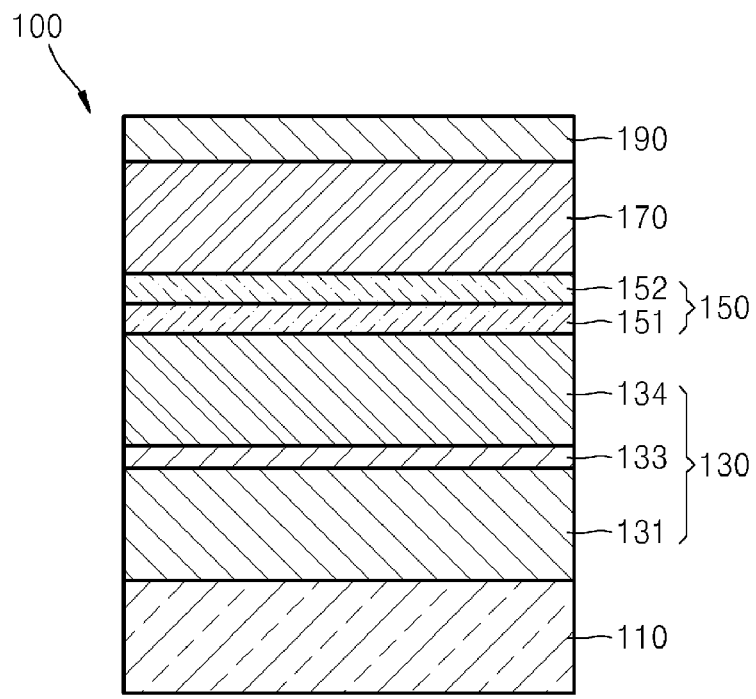
FIG. 1 is a sectional view of an embodiment of a perpendicular type of magnetic recording medium according to the inventive concept.

The inventive concept will now be described more fully with reference to the accompanying drawings. In the drawings, the thicknesses of layers and regions may be exaggerated for clarity. Furthermore, like reference numerals denote like elements throughout the drawings.

Referring to FIG. 1, a perpendicular type of magnetic recording medium 100 according to the inventive concept includes a substrate 110, a soft magnetic material section 130, an intermediate section 150, a recording section 170, and a passivation layer 190 that are sequentially stacked one atop the other in the foregoing order.

The substrate 110 may be of the same material that is used to form the substrate of a conventional perpendicular type of magnetic recording medium. For example, the substrate 110 may be of glass, MgO, AlMg, Si, and the like. Also, the substrate 110 may be circular.

A seed layer (not shown) of Ta or a Ta alloy may be provided on the substrate 110. Such a seed layer is used to facilitate the growth of the material (crystals) of the soft magnetic material section 130 on the substrate. In this case, therefore, the seed layer is interposed between the substrate 110 and the resulting soft magnetic material section 130. Also, a buffer layer (not shown) or a magnetic domain control layer (not shown) may also be provided on the substrate 110 before the soft magnetic material section 130 is formed. Such buffer and magnetic domain control layers are conventional, per se, and therefore, will not be described in further detail.

The soft magnetic material section 130 functions to attract a magnetic field generated by a magnetic head (not shown) during a magnetic recording (write) operation (hereinafter referred to as "writing magnetic field") such that the field lines of the writing magnetic field extend perpendicular to the plane of the recording section 170.

In the embodiment of FIG. 1, the soft magnetic material section 130 includes a lower layer 131 of soft magnetic material, an upper layer 134 of soft magnetic material, and a separation layer 133 interposed between the lower layer 131 of soft magnetic material and the upper layer 134 of soft magnetic material so as to (magnetically) insulate the lower and upper layers 131 and 134 from each other. The lower layer 131 may be a layer of a material selected from the group consisting of an NiFe alloy, CoZrNb, CoZrTa, an FeTa alloy, and an FeCo alloy. The upper layer 134 may also be a layer of a material selected from the group consisting of an NiFe alloy, CoZrNb, CoZrTa, an FeTa alloy, and an FeCo alloy. The separation layer 133 may be of a non-magnetic material such as Ru.

In order to induce a desired crystallization in the material used to form the intermediate section 150, the upper layer 134 is preferably formed of soft magnetic material having the same crystalline structure as that desired for the intermediate section 150. For example, the upper soft magnetic layer 134 may have a face centered cubic (FCC) crystalline structure or a hexagonal close packed (HCP) crystalline structure. Also, the separation layer 133 may function to orient the crystal unit cell structures of the upper layer 134 of soft magnetic material. For example, the separation layer 133 may be formed of Ru having an HCP crystalline structure.

Furthermore, the upper layer 134 of soft magnetic material is formed to generate an anisotropic magnetic field (Hk) stronger (greater magnetic flux) than that generated by the lower layer 131 of soft magnetic material. Also, each of the lower layer 131 and the upper layer 134 is oriented such that its easy axis extends in a cross-track direction of the perpendicular magnetic recording medium 100, i.e., across the tracks of the recording section 170. The lower soft magnetic layer 131 may be thicker than the upper soft magnetic layer 134 so as to more effectively attract the writing magnetic field onto the recording medium 100, and thereby align the field lines of the writing magnetic field so as to be perpendicular to the plane of the recording section 170. For example, the lower soft magnetic layer 131 may have a thickness of 10 nm to 100 nm, and the upper soft magnetic layer 134 may have a thickness of 1 nm to 20 nm.

According to the present embodiment, the lower layer 131 of soft magnetic material, which generates the relatively weak anisotropic magnetic field (Hk), effectively attracts the writing magnetic field so that the writing magnetic field is condensed on the recording section 170. That is, when data is written on the recording section, the lower layer 131 of soft magnetic material is magnetized in a direction of its hard axis so the field lines of the writing magnetic field emanating from a pole of the magnetic head pass through the recording layer 170 and the soft magnetic section 130 and return to a return to the pole of the magnetic head. In this case, the high permeability of the lower layer 131 ensures that the flux of the writing magnetic field passing through the recording section 170 is high and remains constant. Because the lower layer 131 of soft magnetic material having such high permeability increases the intensity of the writing magnetic field, the overwrite-ability of the perpendicular type of magnetic recording medium 100 is improved, which overwrite-ability is otherwise degraded when the perpendicular magnetic anisotropy energy (Ku) is high.

Furthermore, the lower soft magnetic layer 131 has a relatively insecure magnetic domain structure because it is fabricated to generate the weaker anisotropic magnetic field (Hk) to assure a high permeability. As a result, a stray field may be generated in the lower soft magnetic layer 131. However, during a read operation, in which data is reproduced from the recording section 170, the stray magnetic field generated in the lower layer 131 of soft magnetic material is dispersed in the upper layer 134 of soft magnetic material because the upper soft magnetic layer 134 generates the relatively strong anisotropic magnetic field (Hk). Therefore, the stray field is prevented from being noise in the recording section 170 disposed above the upper layer 134. In other words, the field lines of the stray magnetic field are formed in the direction of the hard axis of magnetization of the upper soft magnetic layer 134. Therefore, the stray field generated in the lower soft magnetic layer 131 during data reproduction will not be detected by (the reading sensor of) the magnetic head.

The intermediate section 150 functions to impart a desired crystallographic orientation and magnetic characteristic to the recording section 170. That is, the intermediate layer 150 is formed based on the material and crystalline structure desired for the recording section 170. In this respect, the intermediate section 150 may consist of a single layer of material or may have a multi-layered structure formed of at least a material selected from the group consisting of Ru, a Ru oxide, MgO, and Ni.

For example, in the case in which the recording section 170 is a layer of a Co-alloy or a Co-alloy oxide, the intermediate section 150 is preferably formed of Ru having the same type of crystalline structure as the Co-alloy.

In an example of the embodiment of FIG. 1, the recording section 170 comprises a layer of magnetic grains of material, and the intermediate section 150 has a first intermediate layer 151 of Ru, and a second intermediate layer 152 of Ru and an oxide. The second intermediate layer 152 is disposed on the first intermediate layer 151 and preferably, is thinner than the first intermediate layer 151. For example, the thickness of the first intermediate layer 151 is preferably in a range of 3 nm to 8 nm, and the thickness of the second intermediate layer 152 is preferably in a range of 5 nm to 8 nm. The first intermediate layer 151 and the second intermediate layer 152 also each have a granular structure. In particular, Ru grains of the second intermediate layer 152 are separated from one another by an oxide component of the layer. In this regard, the second intermediate layer 152 can be formed by reactive sputtering in an atmosphere having an oxygen concentration of 0.1 to 5% ($=O_2/(Ar+O_2)$).

The first intermediate layer 151 functions to improve the crystallographic orientation of the layer of material of the recording section 170, and the second intermediate layer 152 functions to control the formation of the grains of the layer of material of the recording section 170. More specifically, the second intermediate layer 152 functions to minimize the grain size (average size of the grains) and to make the size of the grains as uniform as possible.

In the embodiment of FIG. 1 described above, the intermediate section 150 has a thickness in a range of 8 nm to 16 nm, which is significantly less than the thickness (about 20 nm) of an Ru intermediate layer of a conventional perpendicular type of recording medium. The intermediate section 150 has a sufficient thickness, though, because it comprises an epitaxial layer grown on a similar crystalline structure of the upper soft magnetic layer 134. Thus, a magnetic recording medium according to the inventive concept may employ less Ru, which is a relatively expensive material. Therefore, a magnetic recording medium according to the inventive concept may be manufactured at a lower cost.

Also, the magnetic head will be located relatively close to the soft magnetic section 130 (closer than a conventional recording medium which is comparable but which must employ a thicker intermediate section). Thus, dispersion of the writing magnetic field is suppressed. Accordingly, the recording section 170 can be magnetized with a relatively narrow magnetic field. This allows the perpendicular type of magnetic recording medium 100 to have relatively narrow tracks and thus, a correspondingly greater data storage capacity.

The recording section 170, at which data is magnetically recorded, may consist of a single layer of material or may have a multi-layered structure. Furthermore, the recording section 170 can be of the same material as the recording layer of a conventional perpendicular type of magnetic recording medium. Examples of the material include CoPt alloys, CoPt alloy oxides, FePt alloys, and FePt alloy oxides. Also, the recording section 170 may have an FCC crystalline structure or an HCP crystalline structure. The crystallinity of the recording layer 170 is enhanced during its formation by the intermediate section 150 on which the recording section 170 is formed.

The passivation layer 190 protects the recording section 170, and may be a Diamond Like Carbon (DLC) passivation layer. In this case, the DLC passivation layer enhances the surface hardness of the perpendicular type of magnetic recording medium 100. In addition, a lubricating layer (not shown) of a tetraol lubricant, or the like, may be formed on the passivation layer 190. Such a lubricating layer would minimize any abrasion of a magnetic head and the (DLC) passivation layer which may occur if the head is caused to slide along the recording medium 100.

Figure 2:
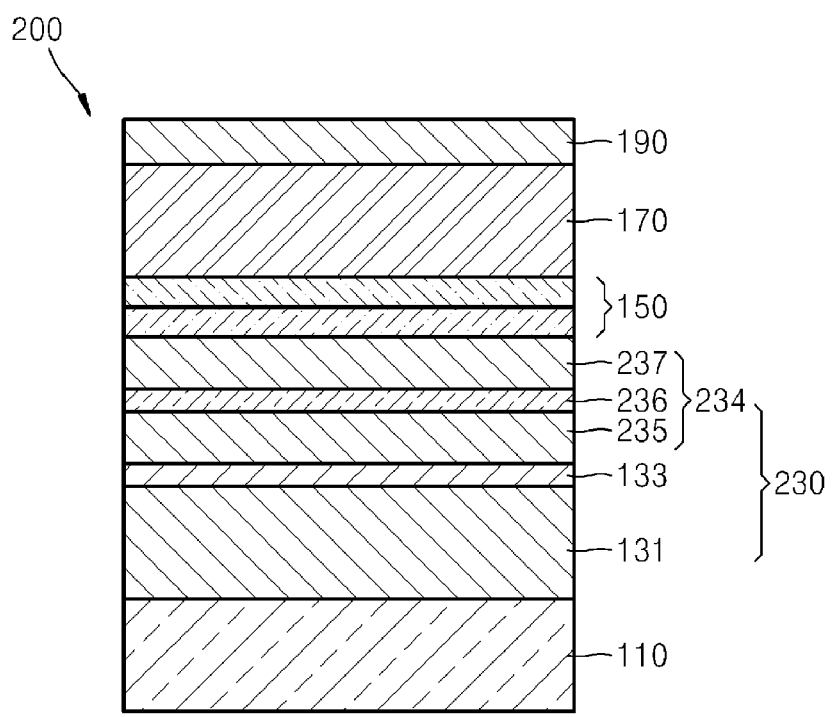
FIG. 2 is a sectional view of diagram of another embodiment of a perpendicular type of magnetic recording medium according to the inventive concept.

FIG. 2 illustrates another embodiment of a perpendicular type of magnetic recording medium 200 according to the inventive concept.

Referring to FIG. 2, the perpendicular type of magnetic recording medium 200 includes a substrate 110, a soft magnetic material section 230, an intermediate section 150, a recording section 170, and a passivation layer 190 that are sequentially stacked one atop the other in the foregoing order. The substrate 110, the intermediate section 150, the recording section 170, and the passivation layer 190 are substantially the same as those of the embodiment of FIG. 1 and thus, will not be described in further detail.

The soft magnetic material section 230 includes a lower layer 131 of soft magnetic material, an upper portion 234 comprising soft magnetic material, and a separation layer 133 interposed between and magnetically insulating the lower layer 131 of soft magnetic material and the upper portion 234. Furthermore, the upper portion 234 includes first and second unit layers 235 and 237 of soft magnetic material, and a spacer 236 interposed between the first and second unit layers 235 and 237. In this embodiment, the first and second unit soft magnetic layers 235 and 237 have a Ruderman-Kittel-Kasuya-Yosida (RKKY) coupling structure in which the layers are anti-ferromagnetically coupled through the non-magnetic metal layer, i.e., the spacer 236, interposed therebetween. The spacer 236, in addition to being of a non-magnetic material, preferably has a thickness of no more than 2 nm, e.g., 0.8 nm, thereby allowing the first and second unit layers 235 and 237 to be anti-ferromagnetically coupled.

The thickness of the first and second unit layers 235 and 237 of soft magnetic material are selected such that the upper layer 234 of soft magnetic material generates a strong anisotropic magnetic field (Hk) to suppress the generation of a domain wall, which would otherwise be a source of noise. For example, the thickness of the first and second unit layers 235 and 237 of soft magnetic material is preferably 5 nm or less. Also, the second unit layer 237 may be formed to have the same type of crystalline structure as that desired for the intermediate layer 150 so that the intermediate layer 150 takes on the desired crystallinity as it is formed. For example, the second unit layer 237 of soft magnetic material may have an FCC crystalline structure or an HCP crystalline structure. Also, the spacer 236 may function to orient the crystal unit cell structures of the second unit layer 237 of soft magnetic material. To this end, the spacer 236 may be formed of Ru having an HCP crystalline structure, for example.

As mentioned above, the upper portion 234 of soft magnetic material has an RKKY coupling structure. Therefore, the lower layer 131 and the upper portion 234 can be formed of the same soft magnetic material, and the upper portion 234 of soft magnetic material may generate an anisotropic magnetic field (Hk) whose flux is greater than that generated by the lower layer 131. In this way, the writing magnetic field is effectively attracted to the recording section 170 but noise due to a stray magnetic field can be prevented.

Furthermore, the crystallinity of the intermediate section 150 is assured during its formation, even though the intermediate section 150 is formed to be relatively thin, by forming the second unit layer 237, i.e., the uppermost layer of upper portion 234, of soft magnetic material having the same type of crystalline structure as that intended for the intermediate section 150. Thus, the embodiment of FIG. 2 may employ less Ru, which is a relatively expensive material. Therefore, a magnetic recording medium according to the inventive concept may be manufactured at a lower cost. Also, the magnetic head will be located relatively close to the section 230 of soft magnetic material (closer than a conventional recording medium which is comparable but which must employ a thicker intermediate section). Thus, dispersion of the writing magnetic field is suppressed. Accordingly, the recording section 170 can be magnetized with a relatively narrow magnetic field. This allows the perpendicular type of magnetic recording medium 200 to have relatively narrow tracks and thus, a correspondingly greater data storage capacity.

Figure 3:
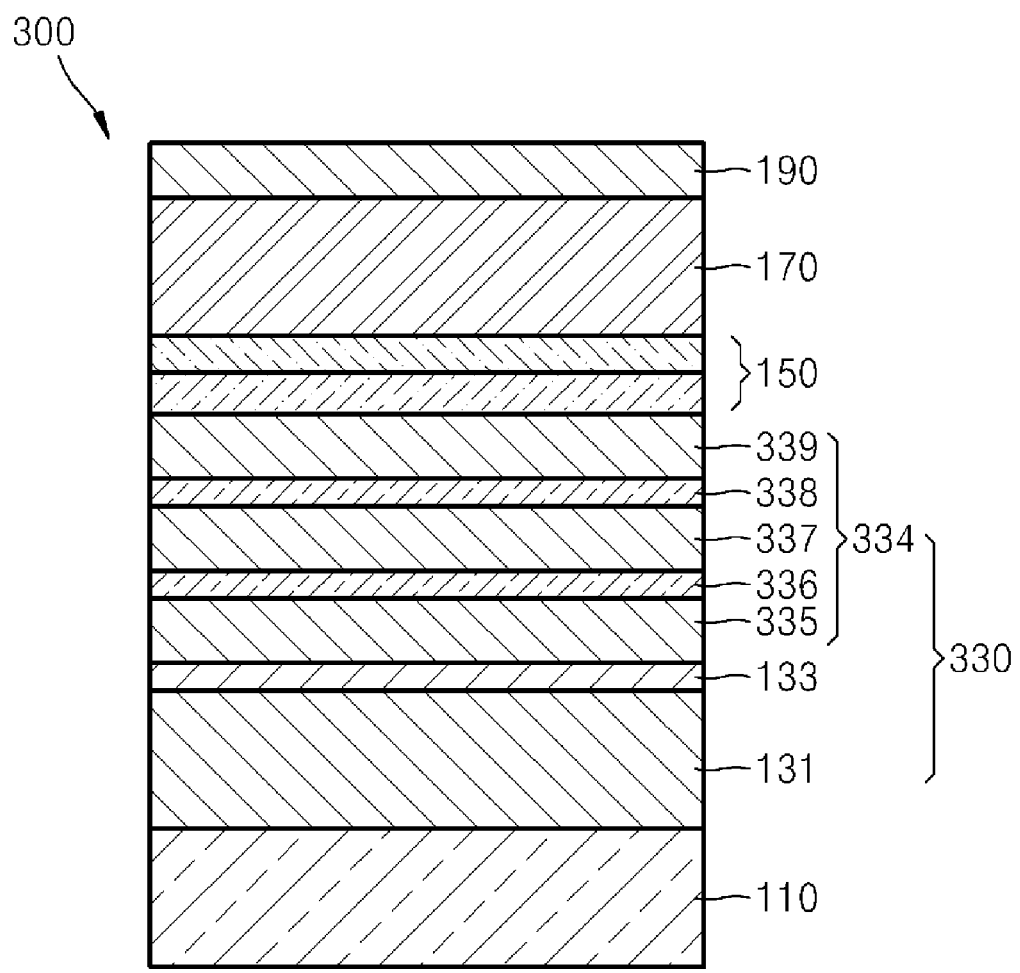
FIG. 3 is a sectional view of still another embodiment of a perpendicular type of magnetic recording medium according to the inventive concept.

FIG. 3 illustrates another embodiment of a perpendicular type of magnetic recording medium 300 according to the inventive concept.

The magnetic recording medium 300 has a soft magnetic section 330 including a lower layer 131 of soft magnetic material, a separation layer 133, and an upper portion 334 of soft magnetic material. The lower layer 131 and the separation layer 133 are substantially the same as those of the embodiment of FIG. 1 and thus, will not be described in further detail.

The upper portion 334 of soft magnetic material has a plurality of unit layers 335, 337, and 339 of soft magnetic material, and a plurality of spacers 336 and 338 each of which is interposed between adjacent ones of a respective pair of the unit layers 335, 337, and 339. Of the unit layers 335, 337, and 339 of soft magnetic material, the unit layer 339 disposed closest to the intermediate section 150 (which unit layer 339 will be referred to hereinafter as "the uppermost unit layer 339") may be formed of material having the same type of crystalline structure as that intended for the intermediate section 150 so as to facilitate the crystallization of the material of the intermediate section 150 as the intermediate section 150 is formed. For example, the uppermost unit layer 339 of soft magnetic material may have an FCC crystalline structure or an HCP crystalline structure. Also, of the spacers 336 and 338, the spacer 336 disposed under the uppermost unit layer 339 of magnetic material (which spacer 336 will be referred to hereinafter as "the uppermost spacer 336") may serve to orient the crystal unit cell structures of the uppermost unit layer 339. To this end, the uppermost spacer 336 may be formed of Ru having an HCP crystalline structure, for example. Thus, the crystallinity of the intermediate section 150 is assured during its formation, even when the intermediate section 150 is formed to be relatively thin.

Finally, embodiments of the inventive concept have been described herein in detail. The inventive concept may, however, be embodied in many different forms and should not be construed as being limited to the embodiments described above. Rather, these embodiments were described so that this disclosure is thorough and complete, and fully conveys the inventive concept to those skilled in the art. Thus, the true spirit and scope of the inventive concept is not limited by the embodiments described above but by the following claims.

What is claimed is:

1. A perpendicular magnetic recording medium comprising:
    a substrate;
    a soft magnetic material section disposed on the substrate, the soft magnetic material section comprising a plurality of distinct layers each of soft magnetic material;
    an intermediate section comprising crystalline material disposed on the soft magnetic material section; and
    a recording section comprising a crystalline layer of magnetic material disposed on the intermediate section,
    wherein the intermediate section comprises a layer of material predisposed to control a crystallizing of the material of the recording section when the recording section is formed on the intermediate section, and
    of the plurality of layers of soft magnetic material, an uppermost one of the layers closest to the intermediate section is predisposed to impart a desired crystalline structure to material of the intermediate section when the intermediate section is formed on the soft magnetic material section,
    wherein the soft magnetic material section includes of a lowermost layer of soft magnetic material and an uppermost portion comprising at least one unit layer of soft magnetic material,
    of all of the layers of soft magnetic material of the medium, the lowermost layer of soft magnetic material is disposed closest to the substrate, and
    the lowermost layer of soft magnetic material generates an anisotropic magnetic field that is weaker than that generated by the uppermost portion of the soft magnetic material section, and
    wherein the uppermost portion of the soft magnetic material section comprises:
    a plurality of unit layers each of soft magnetic material, and spacers interposed between adjacent ones of the unit layers of soft magnetic layer material, and
    adjacent ones of the unit layers of soft magnetic material have a Ruderman-Kittel-Kasuya-Yosida (RKKY) coupling structure, whereby the adjacent ones of the unit layers are magnetically coupled.

2. The perpendicular magnetic recording medium of claim 1, wherein the uppermost layer of soft magnetic material has a same crystalline structure as the intermediate section.

3. The perpendicular magnetic recording medium of claim 1, wherein the uppermost layer of soft magnetic material has an FCC crystalline structure or an HCP crystalline structure.

4. The perpendicular magnetic recording medium of claim 1, wherein the soft magnetic material section further comprises a separation layer of non-magnetic material interposed between the lowermost layer of soft magnetic material and the uppermost portion of the soft magnetic material section.

5. The perpendicular magnetic recording medium of claim 1, wherein the unit layers of soft magnetic material each have a crystalline structure and include the uppermost unit layer of soft magnetic material which, of all of said unit layers, is disposed under and closest to the intermediate section,
    the spacers include an uppermost spacer which, of all of said spacers, is disposed under and closest to the uppermost layer of soft magnetic material, and
    the uppermost spacer is predisposed to orient unit crystal structures of the uppermost unit layer of soft magnetic material when the uppermost unit layer is formed on the uppermost spacer.

6. The perpendicular magnetic recording medium of claim 5, wherein the uppermost spacer comprises a layer of material selected from the group consisting of Ru, MgO, and Ni.

7. The perpendicular magnetic recording medium of claim 1, wherein the intermediate section comprises a layer of material selected from the group consisting of Ru, MgO, and Ni.

8. The perpendicular magnetic recording medium of claim 1, wherein the intermediate section comprises a layer of Ru and a layer of an Ru oxide.

9. The perpendicular magnetic recording medium of claim 1, wherein the thickness of the intermediate section is in a range of 8 nm to 16 nm.

10. The perpendicular magnetic recording medium of claim 9, wherein the intermediate section consists of at least one layer of material comprising Ru.

11. The perpendicular magnetic recording medium of claim 10, wherein the intermediate section consists of a lower layer of Ru, and an upper layer of an Ru oxide.

12. A perpendicular magnetic recording medium comprising:
    a substrate;
    a soft magnetic material section disposed on the substrate, the soft magnetic material section comprising a plurality of distinct layers each of soft magnetic material;
    an intermediate section comprising crystalline material disposed on the soft magnetic material section; and
    a recording section comprising a crystalline layer of magnetic material disposed on the intermediate section,
    wherein the intermediate section comprises a layer of material predisposed to control a crystallizing of the material of the recording section when the recording section is formed on the intermediate section, and
    of the plurality of layers of soft magnetic material, an uppermost one of the layers closest to the intermediate section is predisposed to impart a desired crystalline structure to material of the intermediate section when the intermediate section is formed on the soft magnetic material section,
    wherein the distinct layers of soft magnetic material consist of a lowermost layer of soft magnetic material and an uppermost layer of soft magnetic material,
    the lowermost layer of soft magnetic material is disposed closest to the substrate, and the uppermost layer of soft magnetic material is disposed closest to the intermediate section,
    the lowermost layer of soft magnetic material generates an anisotropic magnetic field that is weaker than that generated by the uppermost layer of soft magnetic material, and
    wherein the lowermost layer of soft magnetic material is thicker and of the same material as the uppermost layer of soft magnetic material.

* * * * *